Dec. 2, 1969  G. SWIFT  3,481,183
APPARATUS FOR DETERMINING DEFLECTIONS OF A STRUCTURE
Original Filed July 30, 1964  4 Sheets-Sheet 2

INVENTOR.
GILBERT SWIFT
BY
Russell E. Schloss
ATTORNEY

INVENTOR.
GILBERT SWIFT

United States Patent Office 3,481,183
Patented Dec. 2, 1969

3,481,183
APPARATUS FOR DETERMINING DEFLECTIONS OF A STRUCTURE
Gilbert Swift, Houston, Tex., assignor to Dresser Industries, Inc., Dallas, Tex., a corporation of Delaware
Continuation of application Ser. No. 386,342, July 30, 1964, and continuation-in-part of application Ser. No. 192,475, May 5, 1962. This application Sept. 12, 1968, Ser. No. 760,125
Int. Cl. G01n 29/00; G01m 7/00
U.S. Cl. 73—67.1      6 Claims

ABSTRACT OF THE DISCLOSURE

A pair of counter-rotating masses are rotated synchronously in a vertical plane, the masses being arranged with respect to a mechanical coupling means which may be formed of a single wheel trailer so as to produce a cyclic variation of the downward force exerted by the wheel of the trailer on the surface of the structure being tested. The trailer is designed with respect to the force generated by the rotatable masses such that there will always be a downward force acting against the surface, avoiding any negative force during the entire cycle of the rotating masses. Motion sensing devices are provided to determine the amplitude of the vertical oscillatory motion and/or the phase angle of the motion with respect to the driving force of the rotating masses.

---

This application is a continuation-in-part of the copending Swift et al. application Ser. No. 192,475, now U.S. Patent No. 3,341,706 issued Sept. 12, 1967.

This application is a continuation of application Ser. No. 386,342, filed July 30, 1964, now abandoned.

This invention relates to a novel apparatus for determining, while either stationary or mobile, the elastic properties of materials forming a structure.

"Structure," as used throughout this application, shall mean any stretch formed of material and shall include natural terrain, various courses of roadways including the finished pavement, airstrips, bridges, foundations, dams, and the like.

In order to be able to determine the strength, durability, condition, and other features of a structure, it is necessary to first ascertain various properties and characteristics thereof. Some of these are the elastic properties, such as stiffness and flexure. Knowledge of such properties enable construction personnel to ascertain if the structure has been adequately compacted and to determine the load bearing capability and the durability thereof. In order to utilize such knowledge during the process of construction, it is highly desirable that the information necessary to ascertain the results be obtained in a fast and economical manner. It is also desirable to have a fast and economical means of surveying finished roadways to find substandard and defective but remediable areas in order to permit timely repair.

At present, there are some processes of statically testing at specific locations along finished roadways to determine the strength thereof. However, there are no known methods presently available for rapidly performing such tests while in transit over the structure, except for the method and apparatus described in said Gilbert Swift et al. copending application.

The various stationary processes of determining elastic properties of a roadway, such as Benkleman Beam Test and Plate Bearing Test are based on the principle of measuring displacement under a known force. In general, a known weight is placed on the surface of the structure and the amount of displacement resulting from such weight is measured. While such processes fulfill the need of providing a means for determining pavement deflection at any one location, the processes are time consuming and only give the deflection at the location tested. Since such processes are time consuming, there is a need for a more expeditious method of determining pavement deflection.

The stationary processes of measuring deflection do not fulfill the need of providing a process for making an overall survey of the roadway from which probable areas of substandard construction may be easily determined. Being able to locate such areas would permit remedial action prior to serious deterioration. Also, due to the fact that present stationary processes are time consuming, they are used mainly for research rather than as a construction maintenance aid on a day-to-day basis. Therefore, there is need for a method of expeditiously surveying the elastic properties of a structure to permit overall evaluation of the structure as an aid in maintenance.

The stationary processes for testing strength are used mainly on paved roadways and not during construction. Therefore, there is a need for a method which may be utilized to expeditiously determine either in a stationary or mobile manner, the strength of a course as it is being constructed. Such knowledge will facilitate ascertaining at what degree of compaction the materials being used will provide adequate strength. Material costs vary in accordance with the volume used, and the cost of compacting effort depends upon the number of passes made or time spent; therefore, it is uneconomical to use more materials and compacting effort than is necessary to achieve the desired result. Accordingly, there is a need for a method of testing strength of a course during construction which can promptly indicate when the desired result has been achieved, whereby the use of surplus material and excess compacting effort is avoided.

The present invention is directed to providing both a stationary and a mobile means of expeditiously determining the elastic properties of structures formed of materials of all kinds.

The method of the present invention comprises impressing on the structure being tested a cyclic repetitive force meanwhile determining a characteristic of the deflections resulting therefrom. The deflections may be determined either just adjacent to the point of application of the force or at multiple positions spaced in fixed relation to the force.

The applied force is deemed constant although varying repetitively from a constant minimum to a constant maximum magnitude. Accordingly, it is only necessary to measure the amplitude of the resulting deflections to determine the stiffness or compliance of the structure.

In addition to the amplitude of the deflections, the time lag or phase angle of the deflections with respect to the applied force may be measured. Both amplitude and phase angle are variables which depend upon the mechanical and elastic properties of the materials forming the structure. If the structure is considered as a simple damped mechanical system comprising a single moveable mass with a restoring force or spring, differences in these characteristics from place to place along the structure indicate differences in the mechanical and elastic properties of the structure. If the repetitive force is applied at a frequency of less than ten cycles per second, which is well below the resonant frequency of most structures found in usual earthen construction, the resulting deflections are affected principally by variations in the spring constant or stiffness of the materials and by the damping factor. Thus, the results produced by this method may be expected to be interpretable in terms of the deflection of the structure per unit weight of load or conversely in terms of the load required for specific deflection or for the destruction of the structure. Moreover, if the rate of applying the force is kept under ten cycles per second, the observations made will coincide essentially with measurements made by the various previously mentioned stationary processes now in use.

One form of apparatus for performing this method may be comprised of a force generating means which will provide a cyclic downward force, coupling means for mechanically coupling such force to the structure being tested and instrumentation for determining the resulting deflection.

The force generating means may be formed by rotating two masses synchronously in opposite directions in a vertical plane. The masses are arranged with respect to a mechanical coupling means which may be formed of a single wheel trailer so as to produce a cyclic variation of the downward force exerted by the wheel of the trailer on the surface of the structure being tested. The trailer is so designed with respect to the force generated by the rotatable masses that there will always be a downward force acting against the surface, avoiding any negative force during the entire cycle of the rotating masses. The material of the structure being tested yields and returns to its original configuration in synchronism with the repetitive force of the wheel of the trailer there against.

One or more motion sensing devices are provided to sense the deflections either adjacent the point of force application or at several spaced positions. Further, appropriate instrumentation is provided to determine amplitude of the vertical oscillatory motion, the phase angle of the motion with respect to the driving force of the rotating masses or both. Alternately, other instrumentation may be utilized to receive the signal from the motion sensing device and form it into resolved components which will comprise the two components of the vertical motion. One of the components will be in phase with the driving force and the other will be at quadrature with respect to the driving force, in other words, orthogonal components.

If the apparatus is used while in transit, the variations in the elastic properties of the materials being tested which exist from place to place in the area being tested are displayed in the form of a multiple trace pen recording along a chart which moves in relation to the distance traversed by the apparatus during the testing operation. If the apparatus is operated on a stationary basis, record is provided of the deflections at each location at which a test is made. These records may then be compared to determine locations having different deflection locations.

It is the object of the present invention to provide a novel apparatus for testing the elastic properties of a structure either while traversing the structure or at a multitude of stationary locations along the structure.

It is another object to provide apparatus which employs cyclic low frequency oscillatory forces to determine either at rest or while in transit the elastic properties of a structure.

It is a further object to provide apparatus having force generating means furnishing a cyclic low frequency vibration for testing the compliance of a structure.

It is still another object to provide apparatus which will provide a continuous record of the elastic properties of the materials constituting a structure while the apparatus is in transit over the structure being tested.

It is a still further object to provide apparatus producing a cyclic repetitive force which will determine in a facile manner and with accuracy the elastic properties of a structure being tested either while stationary or while traversing the structure.

One further object is to provide apparatus employing low frequency cyclic repetitive forces which is capable of determining poor spots in a structure while traversing such structure.

Another further object is to provide a novel apparatus for determining the deflections of a structure resulting from a cyclic force either adjacent the point of application or at a number of positions spaced from the point of application.

It is still a further object to provide an apparatus producing a cyclic repetitive force which is capable of traversing a structure and determining the elastic properties thereof in order to permit evaluation of such structure in accordance with established specifications.

It is still a further object to provide apparatus for determining the extent of the deflections resulting from an applied force both as to direction and distance.

It is still a further object to provide apparatus employing a low frequency cyclic repetitive force which is capable of determining the shape of a deflection bowl of a structure.

The novel features which are believed to be characteristic of the invention, both as to its organization and method of operation, together with further objects and advantages thereof, will be better understood in connection with the accompanying drawings in which a presently preferred embodiment of the invention is illustrated by way of example. It is to be understood, however, that the drawings are for the purpose of illustrations and description only, and are not intended as a definition of the limits of the invention.

Figure 1:
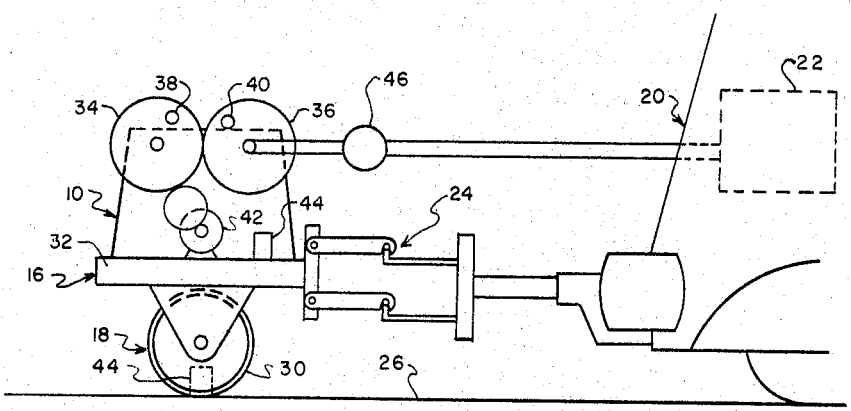
FIG. 1 is a diagrammatic view in elevation of the apparatus of the present invention with a motion detecting device mounted on the trailer.

The present method is based on the principle that the application of a cyclic repetitive force will produce synchronous deflections of the material against which the force is applied. The amplitude of the deflections will depend upon the elastic properties of the structure under test. In general, the amplitude of the deflections will be greatest at the point of application of the force and will diminish with distance away from this point. Structures may deflect either alike or differently at various specific distances from the point of application of a given force. While some structures may deflect alike at one specific distance, these same structures may deflect quite differently at another specific distance from the point of application. Accordingly, structures may be classified according to the amount of deflection at a chosen spot relative to the point of application of the force and also may be classified on the basis of variation of deflection relative to distance from the point of application of the force.

In addition to the differentiation on the basis of amplitude of the deflection, just discussed, there similarly exist differences in the phase angles of deflections relative to the applied force. While differences in the amplitudes of the deflections reflect the compliance reactance of the structure, differences in the phase angles of the deflections reflect the amount of damping of the structure. Although it would be impractical to determine amplitude and phase angle of deflection at every conceivable distance from the point of application, it has been found that by selecting a limited number of specific distances, the elastic properties of the structure can be determined adequately.

The method of the present invention in its broad aspects comprises applying a cyclic repetitive force to the structure under test and meanwhile determining the synchronous deflections resulting therefrom.

The first step of the method is the application of a cyclic repetitive force to the structure under test. Since the invention is directed primarily to performing non-destructive type tests on structures in the construction field, it is desirable that the maximum load applied to the structure be of such a magnitude as not to damage or appreciably alter the structure. However, on the other hand, it is desirable that the minimum load be of such a magnitude so that the load applying means will not tend to lose contact with the structure during its cyclic operation. Within such limits, the cyclic repetitive force may be of any desired magnitude. It is also preferable that the force be applied substantially normal to the plane of the structure and that the cyclic force be of a single frequency.

The deflection of a structure is substantially proportional to the force applied, therefore permitting, through calculations, to relate a resulting deflection to any applied force. However, it is preferable to have the force remain constant thereby not depending upon the above premise and eliminating the necessity of the innumerable calculations which would be required if applied force changed during testing. If the force remains constant, it is unnecessary to take into consideration the force and a determination of resulting deflections reflect the elastic properties of the structure being tested. Therefore, it is desirable to have the force operate at a definite cyclic repetitive rate which does not change during the operation. Also, it is desirable that the mass used in producing the force does not vary and that the distance through which the mass moves in producing the force remains constant.

Having a constant force applied to the structure permits being concerned only with the resulting deflection and eliminates having to calculate the variation in force. However, it is desirable that the magnitude of applied force be known to provide a basis for extrapolation of the data obtained. Such extrapolation permits determination of the probable deflection from greater forces and also permits determination of the maximum force which the structure can maintain. To perform such extrapolation, it is essential that the applied force be known and that it remain constant during testing operations.

It is also necessary that the applied force is mechanically coupled to the structure under test so that substantially all of the force being generated is actually applied to the structure. The coupling can be either rigid or resilient. In either case, the amplitude of the cyclic force should be sufficient to provide a determinable deflection of the structure.

The cyclic range is only limited by the factor that the frequency at which the force is repetitively applied must not be so low that when the method is practiced mobile the distance traversed in one cycle would become so large that inadequate sampling ensues nor should it be so high that the structure fails to react appreciably to the force applied during one cycle.

It has been found that most structures in the construction field have a natural resonance such that if the frequency of the applied force is less than ten cycles per second, the resulting deflection is principally due to compliant reactance rather than mass reactance. Therefore, if the frequency of application is less than ten cycles per second, the mass does not have to be taken into consideration in the interpretation of the deflection. It has been found that by using such frequencies the results more truly reflect the elastic properties of the structure. Also, such frequencies more closely resemble the type of force to which such structures are normally subjected. It has also been found that by using a frequency of less than ten cycles per second that the resulting deflections compare favorably with the previous static methods of testing elastic properties of roadways, thereby enabling the construction personnel to compare the results of the present method with those obtained through the use of the prior stationary testing processes.

Under the influence of the repetitive force, within the aforementioned range of magnitude and frequency, the structure will yield and return in synchronism with the application of the cyclic force, more or less according to the elastic properties of the structure. Accordingly, the structure will vibrate vertically in a manner which depends upon the nature and composition of the structure. Determination of such vibration will reflect the elastic properties of the structure.

The second step in the method is to determine the deflection resulting from the applied force. As with the force, the deflection sensing means must be mechanically coupled to the structure. The coupling should be such that it passes the fundamental frequency of the deflections and preferably does not pass any other frequencies, particularly higher frequencies.

The deflections are normally determined at a point near the place where the force is applied. Doing so provides a general indication of the strength of the structure under test. However, as previously mentioned, while the deflections of two structures may be the same close to the point of the application of the force, the deflections of the two structures may differ at a distance from the point of application. Therefore, for various types of analysis, it is desirable to determine deflections at a plurality of positions each of which is spaced from the point of application. Measuring deflections at multiple positions will permit the determination of variations in the structure which can not be determined by having only a single measuring position. For certain analyses, it may be desired to determine the shape of the bowl of deflection in which case it is desirable to have at least three stations or motion sensing positioned at various distances from the point of application of the force. Another way of determining the bowl of deflection is to maintain the deflection sensing means stationary while the cyclic force traverses the area where the deflection sensing means is located.

The deflection determining step has two aspects. First the resulting deflections of the structure are sensed and then the signals from the sensing device are processed to provide an indication or record of the deflections. If the method is practiced while stationary, it is only necessary to measure and indicate the deflections. However, if the method is practiced while mobile, it is preferable to continuously record an indication of the deflections in relation to the distance traversed.

In addition to determining the amount of amplitude of deflection, which is in general related to the compliance of the structure, the phase angle of the deflections may also be determined. The phase angle will be indicative of the relative amount of damping of the structure. The phase angle may be determined by comparing the cycle of the resulting deflections of the structure with the cyclic application of the force.

After the deflection has been sensed, the signal coming from the motion sensing device is processed. The signal is filtered so that the remaining signal consists principally of the fundamental frequency component with the incoherent noises also being eliminated. It is also desirable to provide filtering facilities such that any force changes that result from speed changes are properly compensated for. The signal is then rectified and integrated to deliver an intelligible signal to an indicator or recorder. When determining the phase angle of deflections, the filtered signal is fed into a phase meter along with a reference signal. The resultant signal from the phase meter indicates the phase angle. This signal may also be indicated or recorded. When the invention is practiced in a stationary manner, it is really only necessary to provide some means of indicating the signal. Although for the purpose of certification, it may be desirable to also record the signal. When the invention is practiced in a mobile manner, it is preferable to provide a continuous record of the signals in relation to distance traversed.

The indicated or recorded amplitude of deflections will reflect the amount of the deflections resulting from the applied force, that is, units of deflections per unit of applied force. The raw data will be directly useful to construction personnel in evaluating the structure traversed. The construction personnel may also desire to extrapolate the data to obtain other information. For example, from a practical standpoint, the applied force will not anywhere near approach the load to which a structure in the construction field is designed to maintain. Therefore, the data may be extrapolated to reflect deflections under loads normally encountered in the construction field. On the other hand, the data may also be extrapolated to determine the maximum load which the structure can support without failing. Accordingly, as previously mentioned, it is desirable to use a known force and maintain it constant throughout testing operations.

As can be seen from the foregoing, the method can be practiced either stationary or mobile. In either case, it is possible in an expeditious manner heretofore unavailable to ascertain the elastic properties of a structure. The amplitude of the deflections will be indicative of compliance of the structure and the phase angle will be indicative of the damping of the structure. If the method is practiced while in transit, it is possible to obtain an overall survey of the structure to determine if the structure is consistent throughout and meets predetermined specifications.

Reference will now be had to the drawings wherein the same reference character will be used throughout the several views to indicate the same item.

FIG. 1 illustrates diagrammatically one embodiment of apparatus for practicing the invention. The apparatus shown therein comprises force generating means 10, means for mechanically coupling the force to the structure and means for determining the synchronous deflections.

Means for mechanically coupling the cyclic force produced by the force generating means 10 to the structure may be formed of a trailer, generally indicated as 16, having a single wheel 18. The trailer 16 is adapted to be towed behind a suitable towing vehicle 20 which is preferably provided with the indicating and recording instrumentation 22. Any suitable means, such as a double trailer hitch 24 or the like may be utilized to maintain the trailer 16 in an upright position during movement along the surface of the structure 26 being surveyed. The wheel 18 of the trailer 16 may be provided with a tire 30 which is relatively hard but sufficiently yielding to distribute the weight of the trailer 16 over a small but finite area of the structure 26.

So that there will always be a downward force exerted on the structure 26, a weighted member 32 may be suitably mounted above the wheel 18 and is preferably fixed or rigidly mounted on the trailer 16 and is of a predetermined weight in order that the load impressed onto the structure 26 may be accurately determined during the testing operation.

In the particular embodiment indicated in FIG. 1, the force generating means 10 is comprised of a pair of counter rotating weight members, such as wheels or gears 34 and 36, each provided with an eccentrically mounted weight member 38 and 40. The counter rotating weighted members 34 and 36 are so arranged with respect to the fixed weighted member 32 and the wheel 18 as to produce a cyclic variation of a downward force exerted by the wheel 12 on the structure 26. It is preferable that the fixed weighted member 32 be proportioned with respect to the rotatable weights 38 and 40 so as to exceed the maximum upward force of the rotating members 34 and 36 in order that there will always be a downward force acting against the structure 26. The rotating members 34 and 36 may be powered in any suitable manner such as by motor 42 for simultaneous rotation thereof in opposite directions. The weighted members 34 and 36 rotating simultaneously and in opposed directions produce a cyclic downward force against the structure 26. The material of the structure 26 being tested yields and returns to its original configuration in synchronism and in response to the cyclic repetitive force of the trailer wheel 18 thereagainst.

The amount of deflection of the structure 26 and hence of the wheel 18 or trailer 16 itself and the time lag or phase angle of this deflection with respect to the applied force are variables which depend upon the mechanical and elastic properties of the material in the structure 26 being tested.

The force exerted by the motion of the pair of counter rotating masses is due the sinusoidal vertical motion of a mass and can be determined by the following formula:

$$F \text{ (in pounds)} = \frac{\text{mass (in pounds)}}{32} \times \text{amplitude (in feet)} \times 4\pi^2 f^2$$

Where $f$ is the frequency in cycles per second.

For example, at a frequency of ten cycles per second, which corresponds to a rotation rate of 600 r.p.m., two 5-lb. masses counter rotating at a radium of one foot will result in peak upward and downward forces of 1232 pounds. Accordingly, the fixed mass 32 should be somewhat more than 1232 pounds to insure that at all times there is a downward force being exerted upon the structure under test. In practice, it would generally be desirable to provide at least another 20 percent at which case the fixed mass would be 1478 pounds. Under these conditions, the load applied to the structure would vary sinusoidally from 246 pounds to 2710 pounds with a frequency of ten cycles per second.

The force generating means 10 is provided with a suitable tachometer or other frequency indicating device for indicating the frequency of the force. The magnitude of the force can then be computed in accordance with the above formula.

The above example is illustrative and representative of a practical case. As mentioned in the previous discussion of the method, other loads, either lighter or heavier at their extremes, may be applied and other frequencies as low or lower than one cycle per second or as high or higher than one hundred cycles per second may be used. Also as mentioned, it is apparent the maximum load must not be so great as to damage or appreciably alter the structure 26, nor must the minimum load be so light that the means mechanically coupling the force to the structure 26 tends to lose contact with the structure 26. Likewise, the frequency with which the force is repetitively applied must not be so low that the distance traversed during one cycle becomes so large that inadequate sampling ensues nor so high that the structure 26 fails to react appreciably to the force during each individual cycle.

Under the influence of the repetitive force, within the forementioned range of force and frequency, the structure 26 will yield and return in synchronism with the applied force, more or less according to the elastic properties of the structure. Accordingly, trailer 16, comprising the wheel 18 with its fixed and moveable weighted members, will vibrate vertically in a manner which depends upon the nature and composition of the structure. The vibration of the trailer 16 may be utilized to determine the amount of deflection. Alternatively, the motion of the structure 26 itself may be measured directly.

By mounting a motion sensing device 44 or an accelerometer on the trailer in firmly fixed relationship to the wheel 18 and the fixed weighted member 32 the amount of vertical motion of the trailer 16 can be sensed.

This motion reflects the deflections of the structure. If the wheel 18 is equipped with a resilient tire 30, the motion of the trailer 16 will be larger than that of the structure 26 by a substantially constant motion attributable to the characteristics of the tire 30. However, when he wheel 18 is not so equipped and is rigidly, though rotatably, connected to the trailer 16, the motion of the trailer becomes substantially equal to that of the structure with which it is in contact. Use of the resilient tire 30 thus introduces an additional component of motion, which may at first appear to be undesirable; however, since the resilient tire 30 increases the area of contact between the force applying means and the structure 26, it thereby tends to diminish the effect of spurious motions which are produced by surface irregularities when the apparatus is traversing the structure. Therefore, to make the apparatus mobile, it is preferable to use a moderately resilient tire 30 for the trailer wheel 18.

As mentioned, one or more motion sensing devices 44 may be located directly on the surface of the structure 26 when the apparatus is operated in a stationary manner. One of such motion sensing devices is shown in phantom on FIG. 1. On nonhomogeneous structures, it may be desirable to use a pair of motion sensing devices located equidistantly from the point of application of the force and the result averaged by combining their outputs (see FIG. 2).

If desired, the motion sensing device 44 may be a geophone. Basically, a geophone consists of a coil suspended by a spring in the field of magnet. When the case of the geophone and the magnet are subjected to a vertical oscillatory motion, the spring suspended coil tends to lag behind this motion. Accordingly, it acquires a velocity relative to the magnet. The output voltage of a geophone is precisely proportional to the instantaneous relative velocity between the magnet and the coil. For any single frequency of excitation, this relative velocity bears a fixed linear relationship to the amplitude of the motion. Therefore, the electrical output of the geophone at this frequency provides a direct measure of the amplitude of the motion. Hence, a geophone can be used as a motion sensing device in the present system.

In order to determine the phase angle of deflection, the apparatus is provided with a phase reference pickup 46 which generates a voltage synchronous and in fixed phase relation with the cyclic force in FIG. 1, the phase reference pickup 46, an alternator, is shown connected to the shaft of one of the rotating members. By comparing the output of the motion sensing device 42 with that of the phase reference pickup 46, the phase of the deflections, relative to that of the cyclic force, can be ascertained. While the amplitude of the motion will, in general, be rated to the compliance of the structure, the phase angle will be indicative of the relative amount of damping in the structure.

Figure 2:
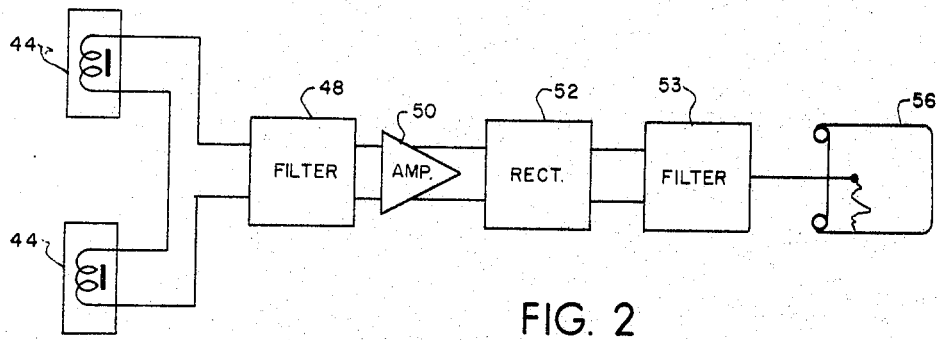
FIG. 2 is a block schematic diagram of the instrumentation for determining the amplitude of the deflections.

To substantially eliminate from the output of the motion sensing device 44 voltages produced by motions at frequencies other than that of the applied oscillatory force, the signals from the motion sensing device 44 are processed before they are indicated or recorded. FIG. 2 illustrates one form of such processing.

As can be seen in FIG. 2, the signal generated by the motion sensing device 44 is passed through a narrow band pass filter 48. The narrow band filter 48 responds only to the fundamental frequency component of the signal from the motion sensing device 44. The signal from the motion sensing devices 44 after passing through the narrow band filter 48 is amplified by amplifier 50. The amplified signal is then rectified by a rectifier 52. The rectified signal is integrated over a period of one second by filter 53 to eliminate incidental variations. The processed signal is finally applied as direct current to actuate a pen 54 of a strip chart recorder 56. The strip chart of recorder 56 is driven from an axle of the towing vehicle 20 so that the length of the record produced corresponds to the distance traveled.

As a consequence of using a sine-wave force, and narrow band filtering of the signal from the motion sensing device, the electrical input to the amplifier is an analog of the fundamental motion of the structure or of the trailer.

If desired, the motion sensing device 44 may be located directly on the surface of the structure when the apparatus is used to determine the elastic properties at specific locations rather than while traversing the structure. Since in such case it is impossible to position the motion sensing device 44 at the specific point of force application, two motion sensing devices 44 may be used. Each device may be spaced an equal distance from the point of application and the response of the two devices added electrically to provide a reading representative of the average deflection of the structure at these two locations.

The calibration of the motion sensing and recording portion of the system may be achieved by placing the motion sensing device 44 on a cam-operated platform driven in synchronism with the rotating masses. The response of the system is adjusted to a standard value with the motion sensing device 44 on the platform, whose sinusoidal motion is fixed at 0.01 inch by the shape and eccentricity of its cam. All the observed responses obtained with the motion sensing device 44 on the structure can then be expressed in terms of the standard response and thereby related to actual deflections in fractions of an inch.

Figure 3:
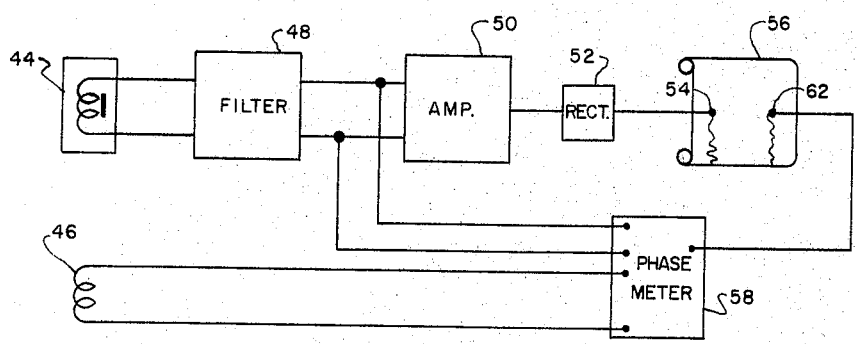
FIG. 3 is a block schematic diagram of the instrumentation for determining the amplitude and phase angle of the deflections.

FIG. 3 illustrates one way to determine the phase angle of the deflection. As shown, a portion of the filtered signal from the motion sensing device 44 is fed into a phase meter 58. The signal, from phase reference pickup 46, on the force generating means 10, is also fed into the phase meter 58. The phase meter 58 compares the phases of these two signals and the resultant signal from the phase meter 58 is indicative of the phase angle between the cyclic force and the resulting deflection. This signal may activate a second pen 62 of the strip chart recorder 56. The amplitude determination portion is the same as FIG. 2.

Figure 4:
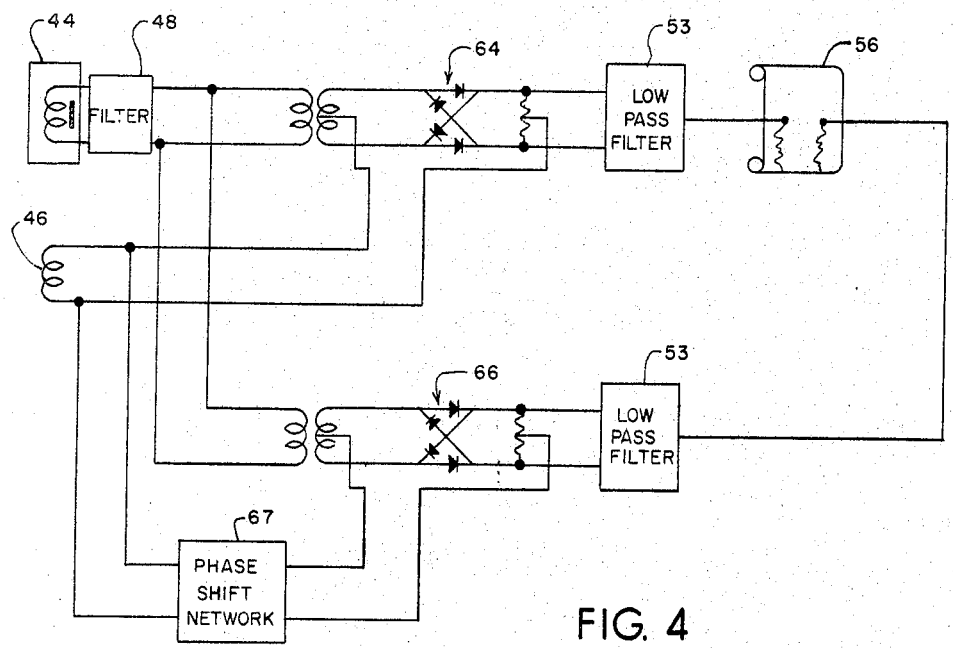
FIG. 4 is a block schematic diagram of the instrumentation for determining the resolved components of the deflections.

FIG. 4 shows an alternate method of determining deflection of the structure. Instead of measuring and recording the amplitude and related phase angle, the signals from the motion sensing device 44 may be applied to a pair of synchronous detectors 64 and 66 which are driven by two reference signals in quadrature with respect to each other. These two reference signals are derived from the cyclic force and bear predetermined phase relationships thereto. One signal comes directly from the phase reference pickup 46. The other signal is also from the phase reference pickup 46 but is passed through a 90 degree phase shift network 67. Hence, DC voltage outputs obtained from the synchronous detectors 64 and 66 are representative of the vector components of the motion of the apparatus and therefore of the characteristics of the structure. By proper selection of the basic reference phase, these vector components may be rendered indicative of the reactive and resistive components of the structures' reaction. The DC output of the synchronous detectors 64–66 after passing through low pass filters 53, are utilized to actuate separate pens on the strip chart recorder 56.

Another advantage which accrues from the use of synchronous detectors is that of obtaining a narrow band frequency response which will follow automatically any variations in the rate of oscillation of the force generating means 10. Thus diminishing or eliminating any requirement for this rate to be precisely controlled as it would have to be to stay within the pass band of a fixed narrow band filter. Applying a suitable low pass filter to the output of the synchronous detector limits the band width of the system to any desired value. The effective mid-band frequency is always that of the reference voltage, not, as in the case of a band pass filter, the predetermined midband frequency. Accordingly, the combination of a synchronous detector, followed by a low pass filter, provides a narrow band response tied directly to the frequency of oscillation of the force generating means 10 and not tied to a specific predetermined frequency.

Figure 5:
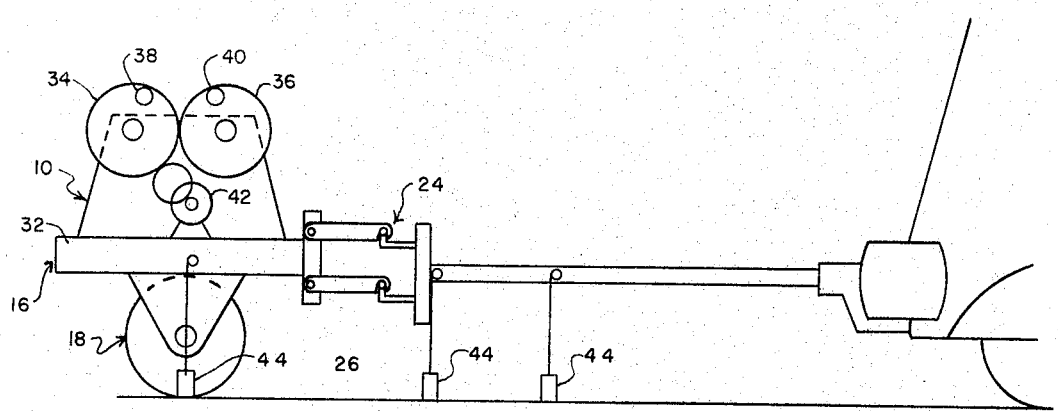
FIG. 5 is a diagrammatic view in elevation of the apparatus being employed in a stationary manner with a plurality of motion sensing devices.

In addition to determining the amplitude and phase angle of deflection at a point near the application of the force, the amplitude and phase angle may be determined at one or more other locations. This may be accomplished when the apparatus is stationary (see FIG. 5) by placing one or more additional motion sensing devices at other spaced positions on the structure. Means may be provided to move the motion sensing devices 44 from the surface of the structure when moving the apparatus from one location to another.

In addition the measuring reaction near the point of application, the deflection at each location is measured and the amplitude, phase angle, or resolved components may be determined in a manner similar to the processing shown in FIGS. 2, 3 and 4.

Determination of deflection at a point close to the application of the force provides a measure of the mechanical impedance of the structure since this impedance is defined as a ratio of force to velocity. A measure of the velocity of its motion in response to a given cyclic force represents the reciprocal of its mechanical impedance and the deflection at a known frequency is a measure of the velocity. Similarly, determining deflection at various distances from the application of force will independently indicate the relative vibration amplitudes at these distances and by intercomparison of the amplitude and phase angle show whether the particular portion of the structure to which a force is being applied is moving in unison, or bending, or rocking or otherwise behaving under the influence of the cyclic driving force.

Figure 6:
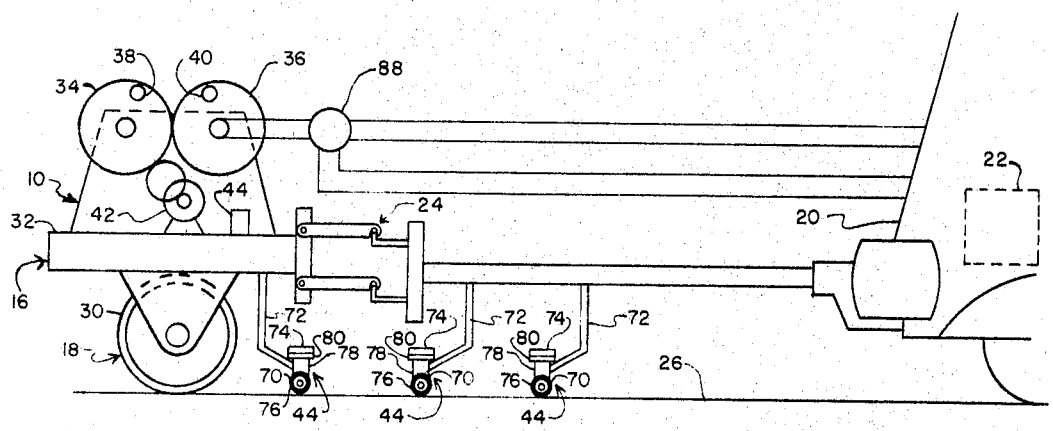
FIG. 6 is a diagrammatic view in elevation of the apparatus being used in transit with a plurality of motion sensing devices.

FIG. 6 shows the apparatus modified to determine deflection at multiple points while the apparatus is traversing the structure. The apparatus, in general, is similar to that shown in FIG. 1; however, the tow bar between the towing vehicle and the trailer is lengthened and a number of independent single wheeled motion sensing carriers 70 are attached to the tow bar 72. The carriers 70 are at spaced predetermined distances from the point of contact of the single trailer wheel 18 which is the means mechanically coupling the cyclic repetitive force to the structure. A separate motion sensing device 74 is provided for each separate wheeled motion sensing carrier 70.

Inasmuch as most structures in the construction field have a rough surface, it will be necessary to construct the auxillary carriers 70 and the support for their motion sensing devices 74 in such a manner that induced vibration is transmitted and that all other vibrations are excluded as much as possible. To assist in the exclusion of unwanted vibrations, the independent single wheeled carriers 70 are provided with a wheel having a semi-soft tire 76 arranged to have an area in contact with the surface of the structure such that the tire 76 absorbs the surface regularities beneath it. The area should be such that its dimension in direction of travel is large compared with the distance traversed during one cycle of motion of the rotating masses. For example, if the masses are rotated at 600 r.p.m. which is $1/10$ second per cycle, and the intended forward velocity is 120 feet per minute (2 feet per second), the length of contact area should be greater than $1/10$ of two feet. The width of the area should be equal or somewhat less than the length. The auxillary carriers 70 are mounted to the tow bar through a proper suspension system which will also tend to eliminate vibrations. For example, a coil spring 78 and shock absorber 80 may be used between the wheel and the mounting for the motion sensing device 74 of each auxillary carrier 70. There should also be restraining supports to maintain the motion sensing device in vertical alignment over the pickup wheel and to position each carrier 70 at a location fixed with respect to the force applying wheel 18 as it traverses the surface of the structure. The mass supported by each carrier 70 including the mass of the motion sensing device 74 should be such that the natural resonant frequency determined by the compliance of the tire 76 and spring 78 together with this mass is higher than the cyclic rate of the force generating means 10. The foregoing serves to diminish the motion of the motion sensing device 74 due to surface irregularities without greatly attenuating the motion caused by the cyclic applied force.

One reason for taking precautions in designing the mounting for the mobile motion sensing device 74 is that in rendering this system mobile, it is necessary to distinguish and measure the vibration of the motion sensing device 74 of each auxillary wheel induced by the oscillatory applied force while ignoring or eliminating the very much greater vibratory motions induced by the forward motion of the apparatus over normally rough surfaces encountered in practice. With the limited amount of force available from the force generating means 10, the motion sensing device 74, due to surface irregularities, may easily be hundreds of times larger than the motion due to the oscillatory applied force. The motion due to surface irregularities tends to be random in nature while that due to the applied cyclic force tends to be sinusoidal and is completely synchronous with the motion of the force generating rotating masses. Nevertheless, the random motion has components in the close vicinity of the synchronous rate which may often exceed the amplitude of the synchronous motion. Therefore, in order to achieve a reliable continuous measurement, it is necessary to have an extremley effective filtering system to accept the signal components due to the applied cyclic force and reject those due to any other phenomena.

Figure 7:
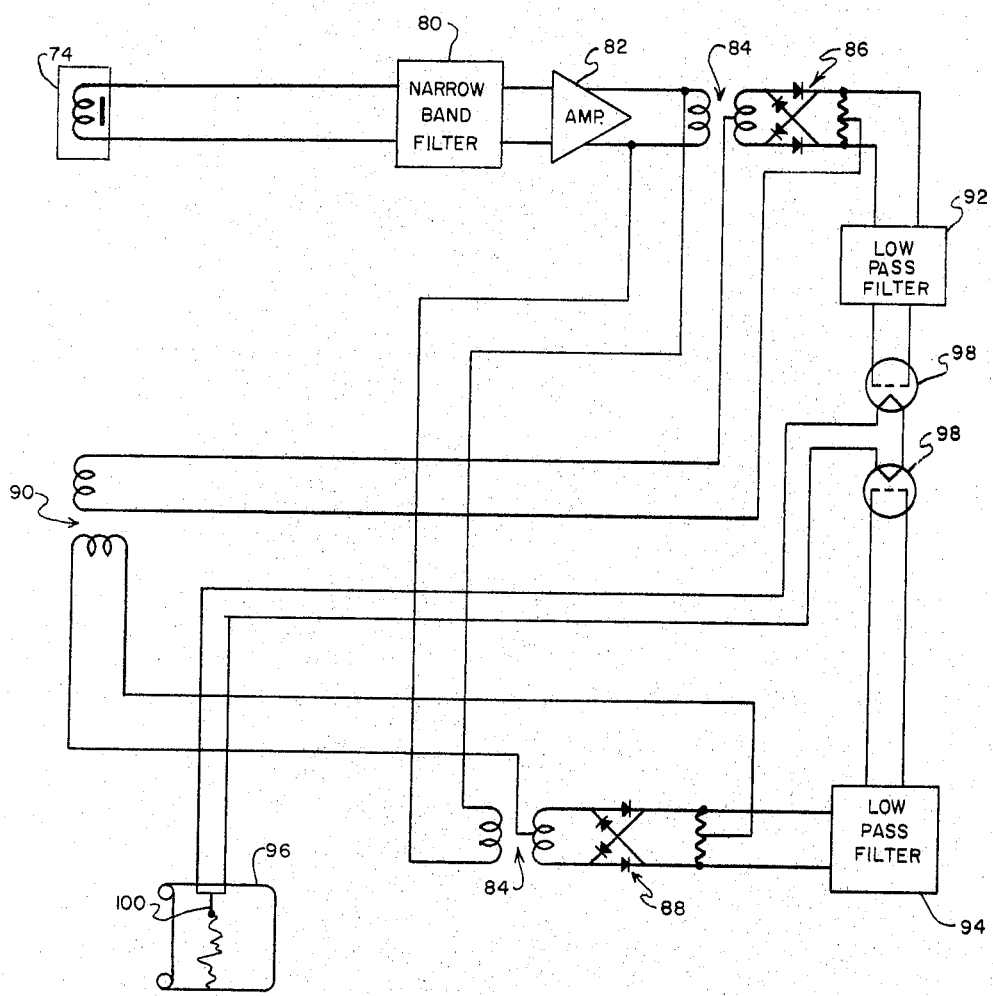
FIG. 7 is a schematic block diagram of instrumentation for determining deflection when apparatus is transit as illustrated in FIG. 6.

In addition to attempting to eliminate all vibration from the motion sensing device 74 that is not caused by the applied force, it is also necessary to take precautions in processing the signals from the motion sensing devices. FIG. 7 shows a schematic circuit diagram for instrumentation which will accomplish this purpose. As shown in FIG. 7, the electrical output of the motion sensing device 74 is fed through an electrical band pass filter 81 to further suppress signals having components of frequencies other than that of the applied force and thence through amplifier 82 and transformer 84 to synchronous detectors 86–88 for further suppression of these undesired components.

The synchronous detectors may be constructed in a well-known manner using a ring of four rectifying elements. The reference voltage for detector 86 is derived from a two phase alternator 90 driven in synchronism with the force generating means 10. The output of the synchronous detector 86 after passing through a low pass smoothing filter 92 is direct current representative of the inphase component of structure motion caused by the applied force. The second synchronous detector 88, whose reference voltage is taken from alternator 90 but in quadrature to the first reference voltage, similarly provides, after passing through low pass filter 94, a DC output representative of the quadrature component of the motion caused by the applied force. These two DC voltages may be recorded as separate traces on a strip chart recorder 96. Alternately, the DC signals from synchronous detectors 86 and 88 may be combined by applying each of them to a heater of separate vacuum thermocouples 98. The outputs from thermocouples 98 are connected in series and used to actuate a single pen 100 of the strip chart recorder 96. The resulting output in this case is representative of the amplitude of motion regardless of its angular relationship to the driving force.

In using multiple spaced apart deflection sensing devices, it is necessary to have a processing channel for each sensing device and the final signal from each of these channels is then fed into a separate pen of a multiple pen strip chart recorder.

Figure 8:
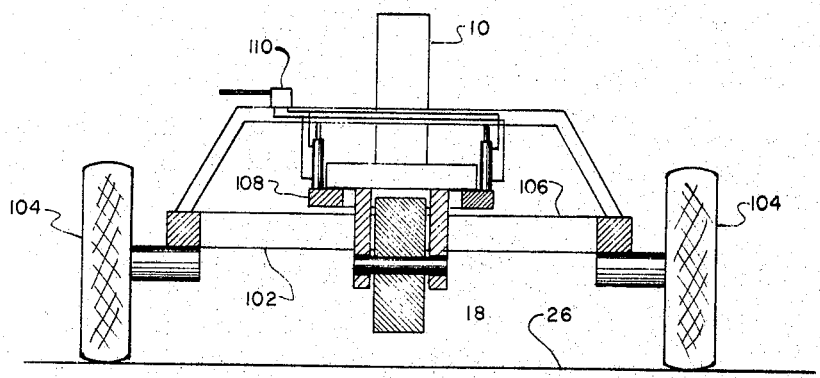
FIG. 8 is a diagrammatic end view of a carrier for transporting by the apparatus from site to site.

In order to move the apparatus over long distances at high speed, a two-wheel trailer carriage may be provided. The carriage is shown in FIG. 8. As can be seen, the carriage 102 has two wheels 104 which are suspended from a frame 106. These wheels are the normal wheels used in transporting the apparatus a long distance. The frame 106 has an inner-frame 108 in which the force generator 10 may be mounted. A hand-operated hydraulic system 110 permits raising and lowering the force generator 10. When the trailer 16 is being transported, it is raised and the weight is then supported by the conventional vehicle wheels 104. However, during operation, the force generator 10 is hydraulically lowered until the wheel 18 supports the entire weight of the trailer 16. This permits the wheel 18 to act as the sole coupling between the force generating means 10 and the structure 26.

As can be seen from the foregoing, the present invention provides a method and apparatus for determining the deflections of a structure resulting from the application of a mobile or stationary cyclic repetitive force which is mechanically coupled to the structure. These deflections may be determined either stationary at various locations along the structure or while traversing the structure. In addition, there is disclosed apparatus for determining deflections at a multiplicity of positions rather than just determining deflections adjacent the means coupling the force generating means to the structure. After the deflection is sensed, the resulting signal is processed to eliminate unwanted components which, in general, are those not caused by the fundamental frequency component of the applied oscillatory force. Therefore, the final signal which may be indicated or recorded represents the characteristics of the deflections of the structure resulting from the applied cyclic force. The final data may be the amplitude of the deflections, or the phase angle of the deflections, or both or the resolved components thereof. The data is in such form that it can be extrapolated to determine the probable results from other loads or the ultimate load limit of the structure.

One particular advantage results from the ability to operate mobily as well as stationarily. This advantage is that a rapid survey can be made by traversing a path along a structure, and then later with the same apparatus making more detailed stationary measurements at specific locations. The mobile survey record provides information from which the locations for the detailed measurements can be intelligently selected. For example, if the mobile survey of a structure reveals one or more regions having appreciable departures from an otherwise uniform characteristic, the locations for detailed testing would ordinarily be chosen within the regions showing departures. As a basis for comparative evaluation, one or more locations within the uniform portion of the structure will also be selected.

Being able to make a rapid survey of a highway and then following with a detailed study of selected locations, makes it economically feasible to test long stretches of highway. It enables the highway personnel to obtain detailed information of abnormal regions without having to apply this time consuming procedure at every location. This renders deflection testing a useful and rapid method of highway evaluation.

What is claimed is:
1. Apparatus for determining deflection properties of a structure comprising:
   a single wheeled trailer;
   force generating means producing a cyclic force of a single frequency mounted on said trailer, said force generating means formed of a pair of counter rotating weighted members;
   a motion sensing device mechanically coupled to the structure to determine deflections of the structure resulting from the application of the force;
   a phase reference pickup coupled in fixed relationship with the force generating means;
   means to process the signals from the motion sensing device together with the signal from the phase reference pickup to derive the orthogonal components of the deflections of the structure with respect to a predetermined reference angle.

2. Apparatus for determining deflection properties of a structure comprising:
   force generating means producing a cyclic force of a single frequency, said force generating means formed of a pair of counter rotating weighted members;
   a motion sensing device mechanically coupled to the structure to determine deflections of the structure resulting from the application of the force;
   a phase reference pickup coupled in fixed relationship with the force generating means;
   means to process the signals from the motion sensing device together with the signal from the phase reference pickup to derive the orthogonal components of the deflections of the structure with respect to a predetermined reference angle.

3. Apparatus for determining deflection properties of a structure comprising:
   a single wheeled trailer;
   means to move said trailer over the structure to be tested;
   force generating means producing a cyclic force of a single frequency mounted on said trailer;
   a motion sensing device mounted on said trailer to determine deflections of the trailer as influenced by the character of the structure;
   a phase reference pickup coupled in fixed relationship with the force generating means;
   means to process the signals from the motion sensing device together with the signal from the phase reference pickup to derive the orthogonal components of the deflections of the structure with respect to a predetermined reference angle;
   means to record as a log relative to the distance traversed the orthogonal components.

4. Apparatus for determining deflection properties of a structure comprising:
   a single wheeled trailer;
   a plurality of single wheeled motion sensing carriers spaced in fixed relationship from said trailer;
   means to move said trailer and motion sensing carriers over the structure to be tested;
   force generating means producing a cyclic force of a single frequency mounted on said trailer;
   a phase reference pickup coupled in fixed relationship with the force generating means;
   a plurality of motion sensing devices, one of said motion sensing devices mounted on said trailer, the other of said motion sensing devices being each separately mounted on said sensing carriers which are spaced from the trailer;
   separate channels means to process the signals from each of the separate motion sensing devices together with the signal from the phase reference pickup to derive the orthogonal components of the deflections of the structure with respect to a predetermined reference angle.

5. Apparatus for determining deflection properties of a structure comprising:
   means generating a cyclic force of a single frequency;
   means mechanically coupling said cyclic force to the structure to be tested;
   a motion sensing device mechanically coupled to the structure detecting deflections of the structure resulting from the application of the applied cyclic force;

a phase reference pickup in fixed relationship with the force generating means;

and means processing the signals received from the motion sensing device and phase reference pickup to provide an indication of the resolved components of the deflections.

6. The apparatus defined in claim 5 in which the processing means is formed of a pair of synchronous phase detectors, the signals from the motion sensing device being fed into said pair of synchronous detectors, the signal from the phase reference pickup being fed directly to one synchronous detector and being fed to the other synchronous detector with a predetermined phase shift, a pair of low pass filters, each one receiving the output from one of the synchronous detectors.

References Cited

UNITED STATES PATENTS

| | | | |
|---|---|---|---|
| 2,412,240 | 12/1946 | Williams et al. | 73—67 |
| 2,833,143 | 5/1958 | Wales | 73—67.1 |
| 2,910,134 | 10/1959 | Crawford et al. | 181—0.5 |
| 3,030,803 | 4/1962 | Painter | 73—67.1 |
| 3,191,431 | 6/1965 | Schloss | 73—67.1 |
| 3,229,784 | 1/1966 | Lyons et al. | 181—0.5 |

RICHARD C. QUEISSER, Primary Examiner

J. P. BEAUCHAMP, Assistant Examiner

U.S. Cl. X.R.

73—146